US008416771B2

(12) United States Patent
Ishimoto

(10) Patent No.: US 8,416,771 B2
(45) Date of Patent: Apr. 9, 2013

(54) TELEPHONE APPARATUS AND COMPUTER READABLE MEDIUM

(75) Inventor: Kan Ishimoto, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 97 days.

(21) Appl. No.: 12/976,312

(22) Filed: Dec. 22, 2010

(65) Prior Publication Data

US 2011/0158225 A1    Jun. 30, 2011

(30) Foreign Application Priority Data

Dec. 25, 2009    (JP) .................................. 2009-294236

(51) Int. Cl.
*H04L 12/66* (2006.01)
*H04J 3/16* (2006.01)
*H04M 7/00* (2006.01)

(52) U.S. Cl.
USPC ....................... 370/356; 370/466; 379/221.01

(58) Field of Classification Search ........................ None
See application file for complete search history.

(56) References Cited

U.S. PATENT DOCUMENTS

| 4,518,827 | A  | * | 5/1985  | Sagara  | 379/67.1 |
| 6,253,249 | B1 | * | 6/2001  | Belzile | 709/249 |
| 6,636,506 | B1 | * | 10/2003 | Fan     | 370/356 |
| 6,876,648 | B1 |   | 4/2005  | Lee     |         |

| 2004/0218748 | A1 | * | 11/2004 | Fisher       | 379/221.01 |
| 2006/0153169 | A1 | * | 7/2006  | Koifman et al.| 370/352 |
| 2006/0281437 | A1 | * | 12/2006 | Cook         | 455/404.2 |
| 2008/0165706 | A1 | * | 7/2008  | Bozionek     | 370/259 |

FOREIGN PATENT DOCUMENTS

| JP | 7-50729      |   | 2/1995  |
| JP | H09-154175   | A | 6/1997  |
| JP | H11-069064   | A | 3/1999  |
| JP | 2000-295645  |   | 10/2000 |
| JP | 2001-217862  | A | 8/2001  |
| JP | 2001-217960  |   | 8/2001  |
| JP | 2001-257723  |   | 9/2001  |
| JP | 2006-203445  |   | 8/2006  |
| JP | 2006-287983  |   | 10/2006 |

OTHER PUBLICATIONS

Japanese Official Action dated Nov. 27, 2012 from related application JP 2009-294236 together with an English language translation.

* cited by examiner

*Primary Examiner* — Melanie Jagannathan
(74) *Attorney, Agent, or Firm* — Scully, Scott, Murphy & Presser, P.C.

(57) ABSTRACT

A telephone apparatus that can be connected to both an IP network and a public switched telephone network, the telephone apparatus includes: a microphone unit, a speaker unit, an operation unit that is operated by a user and a call control unit. The call control unit includes a call processing unit and a relay unit. The relay unit includes a call request transmission section; a conversion section; an analog voice data transmission section; and a digital voice data transmission section. Another telephone apparatus that can be connected to the IP network can perform a voice data communication with a public line telephone apparatus connected to the public switched telephone network, via the above-described telephone apparatus.

9 Claims, 9 Drawing Sheets

FIG. 2

70: PORTABLE RATE TABLE

| RATE PLAN | FIXED UPPER LIMIT AMOUNT | PACKET RATE | CALLING RATE | AMOUNT OF FREE TELEPHONE CALL |
|---|---|---|---|---|
| FIRST PLAN | 4410 | 7 | 60 | 0 |
| SECOND PLAN | 4410 | 10 | 30 | 2000 |
| THIRD PLAN | NONE | 15 | 60 | 0 |
| FOURTH PLAN | NONE | 7 | 30 | 2000 |

FIG. 3

80: PSTN RATE TABLE

| AREA CODE | CALLING RATE |
|---|---|
| SAME AREA CODE | 10 |
| AREA CODE GROUP OF FIRST TYPE | 20 |
| AREA CODE GROUP OF SECOND TYPE | 30 |
| AREA CODE GROUP OF THIRD TYPE | 40 |

TELEPHONE APPARATUS AND COMPUTER READABLE MEDIUM

CROSS REFERENCE TO RELATED APPLICATION

The present application claims priority from Japanese Patent Application No. 2009-294236, which was filed on Dec. 25, 2009, the disclosure of which is herein incorporated by reference in its entirety.

TECHNICAL FIELD

The apparatuses and devices consistent with the present invention is related to a telephone apparatus that can be connected to both an IP network and a public switched telephone network.

BACKGROUND

A relate art discloses a telephone apparatus that can be connected to a public switched telephone network. The telephone apparatus can perform a voice data communication with another telephone apparatus via the public switched telephone network.

SUMMARY

There is a telephone apparatus that can be connected to an IP network. In some cases, it is not preferable that the telephone apparatus directly performs a voice data communication with a public line telephone apparatus connected to the public switched telephone network. In this specification, it is disclosed a technology in which a telephone apparatus that can be connected to the IP network can perform a voice data communication with a public line telephone apparatus connected to the public switched telephone network.

According to an illustrative aspect of the present invention, there is provided a telephone apparatus that can be connected to both an IP network and a public switched telephone network, the telephone apparatus comprising: a microphone unit, a speaker unit, an operation unit that is operated by a user and a call control unit, wherein the call control unit comprises: a call processing unit that, for at least one of a first case where an operation of transmitting a first call request to a first public line telephone apparatus via the public switched telephone network is performed with the operation unit, the first public line telephone apparatus being connected to the public switched telephone network, and a second case where a second call request is received from the first public line telephone apparatus via the public switched telephone network, transmits first analog voice data obtained by the microphone unit to the first public line telephone apparatus via the public switched telephone network and supplies the speaker unit with second analog voice data received from the first public line telephone apparatus via the public switched telephone network; and a relay unit that, for a third case where an IP packet of a first type including specific identification information corresponding to a second public line telephone apparatus connected to the public switched telephone network is received from another telephone apparatus via the IP network, the another telephone apparatus capable of being connected to the IP network, relays voice data communication between the another telephone apparatus and the second public line telephone apparatus, wherein the relay unit comprises: a call request transmission section that, for the third case, transmits a third call request to the second public line telephone apparatus via the public switched telephone network; a conversion section that D/A converts first digital voice data, which is included in an IP packet of a second type received from the another telephone apparatus via the IP network, into third analog voice data and A/D converts fourth analog voice data received from the second public line telephone apparatus via the public switched telephone network into second digital voice data; an analog voice data transmission section that transmits the third analog voice data to the second public line telephone apparatus via the public switched telephone network; and a digital voice data transmission section that transmits an IP packet of a third type including the second digital voice data to the another telephone apparatus via the IP network.

According to another illustrative aspect of the present invention, there is provided a computer readable medium storing a program for a telephone apparatus that can be connected to an IP network, the program enabling a computer mounted to the telephone apparatus to execute: a selection process of selecting whether to perform a voice data communication with a public line telephone apparatus connected to a public switched telephone network through another telephone apparatus that can be connected to both the IP network and the public switched telephone network or to perform a voice data communication with the public line telephone apparatus without through another telephone apparatus; a first transmission process of transmitting an IP packet of a first type including specific identification information corresponding to the public line telephone apparatus to the another telephone apparatus via the IP network; a second transmission process of transmitting an IP packet of a second type including first digital voice data corresponding to analog voice data obtained by a microphone unit of the telephone apparatus to the another telephone apparatus via the IP network when it is selected to perform the voice data communication through the another telephone apparatus; and a supply process of supplying a speaker unit of the telephone apparatus with analog voice data corresponding to second digital voice data included in an IP packet of a third type received from the another telephone apparatus via the IP network.

BRIEF DESCRIPTION OF THE DRAWINGS

Illustrative aspects of the invention will be described in detail with reference to the following figures wherein:

FIG. 2 shows an example of a portable rate table;
FIG. 3 shows an example of a PSTN rate table.

DETAILED DESCRIPTIONS OF EXEMPLARY EMBODIMENTS OF THE PRESENT INVENTION

First Exemplary Embodiment (Structure of Network System 2)

Figure 1:
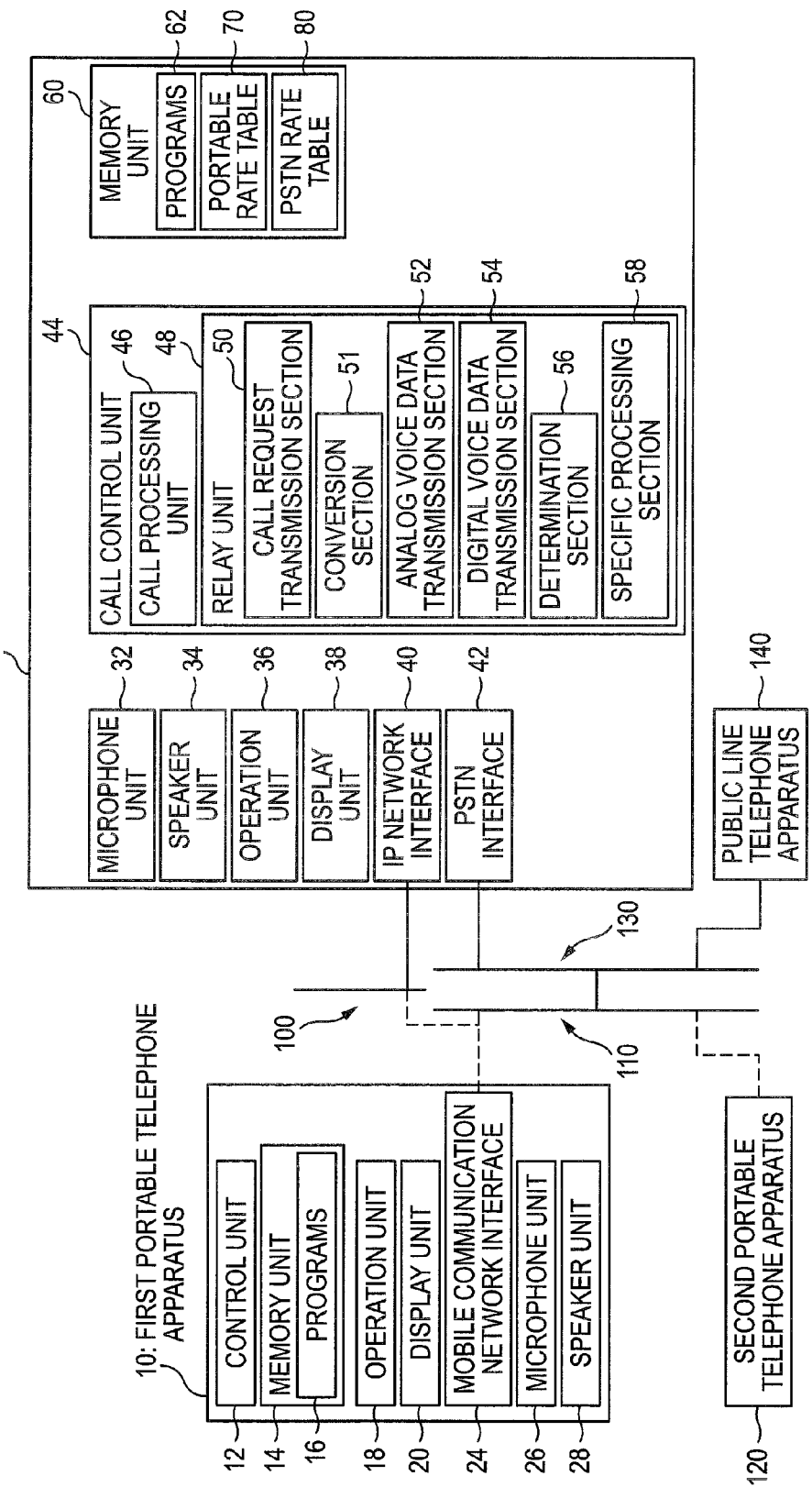
FIG. 1 shows a structure of a network system.

A first exemplary embodiment will be described with reference to the drawings. FIG. 1 shows a structure of a network system 2 of this exemplary embodiment. The network system 2 includes a first portable telephone apparatus 10, a multi-functional apparatus 30, a second portable telephone apparatus 120, a public line telephone apparatus 140, an IP network 100, a mobile communication network 110 (for example, TDMA and CDMA) and a PSTN 130. The IP network 100 includes a base station and a switching center, which are not shown. The IP network 100 is a transmission route for transmitting IP packets. The first portable telephone apparatus 10 and the multi-functional apparatus 30 can be connected to the IP network 100. In other words, the first portable telephone apparatus 10 and the multi-functional apparatus 30 can perform an IP packet communication via the IP network 100. The mobile communication network 110 includes a switching center and the like, which are not shown. The mobile communication network 110 is a transmission route for transmitting digital voice data. The first portable telephone apparatus 10 and the second portable telephone apparatus 120 are connected to the mobile communication network 110. In other words, the first portable telephone apparatus 10 and the second portable telephone apparatus 120 can perform a digital voice data communication via the mobile communication network 110. The PSTN 130 includes a switching center that is not shown. The PSTN 130 is a transmission route for transmitting analog voice data. The multi-functional apparatus 30 and the public line telephone apparatus 140 are connected to the PSTN 130. In other words, the multi-functional apparatus 30 and the public line telephone apparatus 140 can perform an analog voice data communication via the PSTN 130. In addition, the dotted line shown in FIG. 1 indicates that the first portable telephone apparatus 10 can be wirelessly connected to the IP network 100 and the mobile communication network 110 and the second portable telephone apparatus 120 can be wirelessly connected to the mobile communication network 110.

The mobile communication network 110 and the PSTN 130 are connected so that they can communicate with each other. Digital voice data transmitted by the mobile communication network 110 is converted into analog voice data by the switching center, which is then transmitted to the PSTN 130. Likewise, analog voice data transmitted by the PSTN 130 is converted into digital voice data by the switching center, which is then transmitted to the mobile communication network 110. For example, when a voice data communication is performed between the first portable telephone apparatus 10 and the multi-functional apparatus 30, digital voice data transmitted from the first portable telephone apparatus 10 is converted into analog voice data by the switching center, which is then transmitted to the multi-functional apparatus 30. In addition, the number of the respective apparatuses 10, 30, 120, 140 in the network system 2 is not limited.

(Structure of First Portable Telephone Apparatus 10)

The first portable telephone apparatus 10 has a control unit 12, a memory unit 14, an operation unit 18, a display unit 20, a mobile communication network interface 24, a microphone unit 26 and a speaker unit 28. The operation unit 18 has a plurality of keys such as hook key and ten key. A user can operate the operation unit 18 to enable the first portable telephone apparatus 10 to execute a variety of processes. For example, a user can operate the operation unit 18 to make a call to another telephone apparatus (for example, multi-functional apparatus 30 and second portable telephone apparatus 120) connected to the mobile communication network 110. The user can talk over the telephone with the microphone unit 26 and the speaker unit 28. The display unit 20 can display a variety of information. The memory unit 14 stores programs 16 that should be executed by the control unit 12. In addition, the programs 16 include an application program. The first portable telephone apparatus 10 can perform a digital voice data communication with an external apparatus (for example, second portable telephone apparatus 120) via the mobile communication network 110 from the mobile communication network interface 24. In addition, the first portable telephone apparatus 10 can be connected to the IP network 100 via a switching center from the mobile communication network interface 24 and can perform an IP packet communication with an external apparatus (for example, multi-functional apparatus 30). The second portable telephone apparatus 120 has the same structure as that of the first portable telephone apparatus 10.

(Structure of Multi-Functional Apparatus 30)

The multi-functional apparatus 30 has a microphone unit 32, a speaker unit 34, an operation unit 36, a display unit 38, an IP network interface 40, a PSTN interface 42, a call control unit 44 and a memory unit 60. The operation unit 36 has a plurality of keys (for example, ten key and start key). A user can operate the operation unit 36 to enable the multi-functional apparatus 30 to perform a variety of processes. A user can operate the operation unit 36 to make a call to another telephone apparatus (for example, public line telephone apparatus 140) connected to the PSTN 130. The user can talk over the telephone with the microphone unit 32 and the speaker unit 34. The display unit 38 is a display for displaying a variety of information. The IP network interface 40 is an interface for an IP packet communication with an external apparatus (for example, first portable telephone apparatus 10) via the IP network 100. The PSTN interface 42 is an interface for performing an analog voice data communication with an external apparatus (for example, public line telephone apparatus 140) via the PSTN.

The call control unit 44 executes a variety of processes in accordance with the programs 62 stored in the memory unit 60. As the call control unit 44 executes processes in accordance with the programs 62, functions of a call processing unit 46 and a relay unit 48 are realized. The relay unit 48 has a call request transmission section 50 and a conversion section 51, an analog voice data transmission section 52, a digital voice data transmission section 54, a determination section 56 and a specific processing section 58. The multi-functional apparatus 30 has a print execution unit, a scanner unit and the like for executing printing and scanning functions and the like, in addition to the above units.

The memory unit 60 stores programs 62, a portable rate table 70 and a PSTN rate table 80. The program 62 includes a program for a process that is executed by the call control unit 44. The portable rate table 70 and the PSTN rate table 80 are made in advance by a vendor and are stored in the memory unit 60.

As shown in FIG. 2, a plurality of rate plans 76 to 79 is registered in the portable rate table 70. The portable rate table 70 is used by the multi-functional apparatus 30 when the multi-functional apparatus 30 executes a rate information generation process that will be described below (refer to S78 of FIG. 5 (FIG. 5A and FIG. 5B)). Each of the rate plans 76 to 79 is information in which a rate plan 71, a fixed upper limit amount 72, a packet rate 73, a calling rate 74 and an amount of free telephone call 75 are matched. A vendor makes the rate plans 76 to 79, based on rate plans provided by a carrier of a portable telephone apparatus. The packet rate 73 is a rate per unit time (for example per 180 seconds) when a portable telephone apparatus performs an IP packet communication via the IP network 100. A vendor calculates the packet rate 73 as follows. In a rate plan of a carrier, a rate per HP packet, which is typically communicated by the IP packet communication, is determined. The vendor investigates the number of IP packets that are communicated per unit time when a digital voice data communication is performed through the IP packet communication using a portable telephone apparatus. Then, the vendor multiplies the investigated number of IP packets by a rate per 1 IP packet, thereby calculating the packet rate 73.

The fixed upper limit amount 72 is a predetermined upper limit amount in the rate plan of the carrier. For example, in the first and second plans 76, 77, when (the number of IP packets)×(rate per one IP packet) (hereinafter, referred to as "IP packet communication rate") for a predetermined time period (for example, one month) is equal to or less than the fixed upper limit amount 72, a user pays the IP packet communication rate to the carrier. When the IP packet communication rate exceeds the fixed upper limit amount 72, the user pays the fixed upper limit amount to the carrier, as a communication rate. However, in the third and fourth plans 78, 79, the user pays the IP packet communication rate to the carrier, as a communication rate.

The calling rate 74 is a rate per unit time when a portable telephone apparatus performs a digital voice data communication via the mobile communication network 110. A call charge is calculated by multiplying the calling rate 74 by an integer (the remainder is rounded off) of call duration/unit time. The amount of free telephone call 75 is a predetermined amount in the rate plan of a carrier. A user pays the carrier an amount obtained by subtracting the amount of free telephone call 75 from the call charge, as a communication rate. In addition, when the subtracted amount is minus, an amount that a user should pay as a communication rate is zero.

As shown in FIG. 3, an area code 81 and a calling rate 82 are matched and registered in the PSTN rate table 80. A vendor makes the PSTN rate table 80, based on a call charge set by a carrier of a public line telephone apparatus. The calling rate 82 is a call charge per unit time when the multi-functional apparatus 30 performs an analog voice data communication with another telephone apparatus (for example, public line telephone apparatus 140) via the PSTN 130. The area code 81 is classified by the calling rate 82. A same area code 83 is a phone number corresponding to the same area code as the phone number of the multi-functional apparatus 30. Each of area code groups 84 to 86 of first to third types includes one or more area codes in which a call charge per unit time is same, based on the same area code 83. Based on areas of the same area code 83, the area code group 84 of the first type is an area code of the nearest area, the area code group 85 of the second type is an area code of the next nearest area and the area code group 86 of the third type is an area code of the farthest area. A vendor makes a plurality of PSTN rate tables 80 corresponding to a plurality of area codes and stores them in the memory unit 60 of the multi-functional apparatus 30 (refer to FIG. 1). In another exemplary embodiment, the call control unit 44 of the multi-functional apparatus 30 may obtain the PSTN rate table 80 corresponding to an area code of the multi-functional apparatus 30 from a server of the vendor and the like via the IP network 100 and the like. In addition, the PSTN rate table 80 is just an example. For instance, when a calling rate is different depending on call time zones, a table may be stored in which a call time zone and a calling rate are matched.

(Process that First Portable Telephone Apparatus 10 Executes)

In the followings, a process that the control unit 12 of the first portable telephone apparatus 10 executes in accordance with an application will be described. In addition, the control unit 12 of the first portable telephone apparatus 10 may execute a typical call process and the like (in other words, a process for executing a digital voice data communication, and the like via the mobile communication network 110) in accordance with a program except the application, based on a predetermined operation of a user. As a pre-step of a process of FIG. 4 (FIG. 4A and FIG. 4B) that the first portable telephone apparatus 10 executes, a user registers the first portable telephone apparatus 10 in the multi-functional apparatus 30. The user operates the operation unit 36 of the multi-functional apparatus 30 (refer to FIG. 1) to input identification information for identifying the first portable telephone apparatus 10 (for example, phone number of the first portable telephone apparatus 10) and authentication information for authenticating the first portable telephone apparatus 10 into the multi-functional apparatus 30. The multi-functional apparatus 30 displays the portable rate table 70 on the display unit 38 (refer to FIG. 1). The user operates the operation unit 36 to select a rate plan corresponding to the first portable telephone apparatus 10 from the rate plan 71 of the portable rate table 70. The multi-functional apparatus 30 matches and stores the inputted identification information and authentication information of the first portable telephone apparatus 10 and the selected rate plan 71 in the memory unit 60.

Figures 4, 4A, 4B:
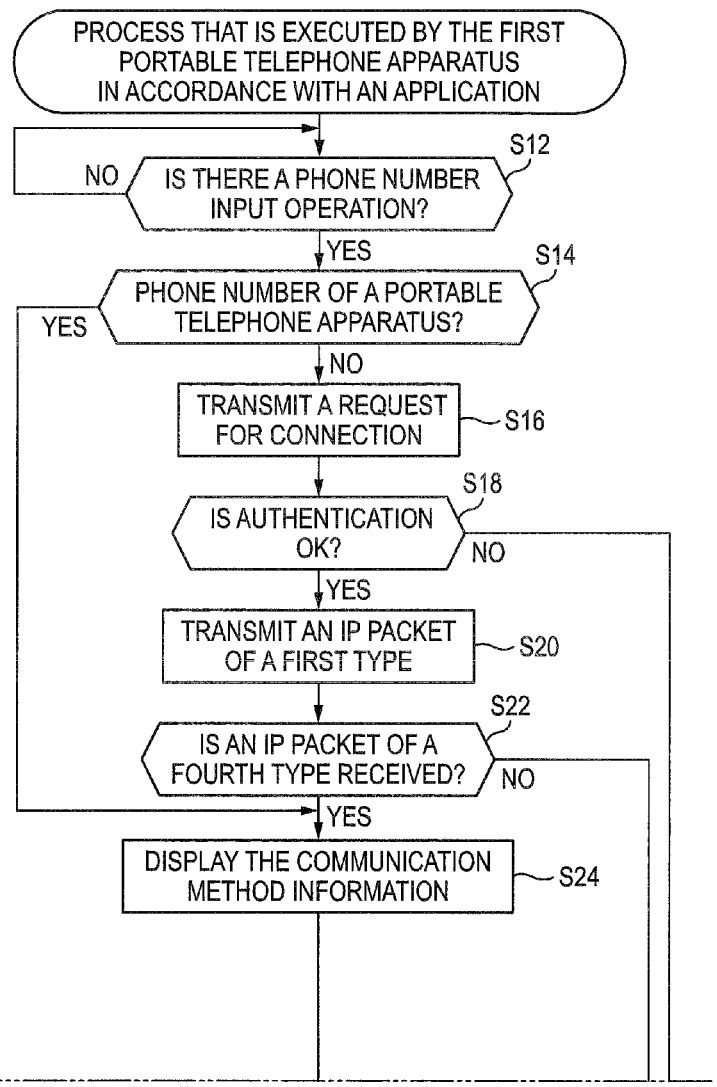
FIG. 4A and FIG. 4B are flowcharts of a process that is executed by a first portable telephone apparatus of a first exemplary embodiment.
Figure 4B:
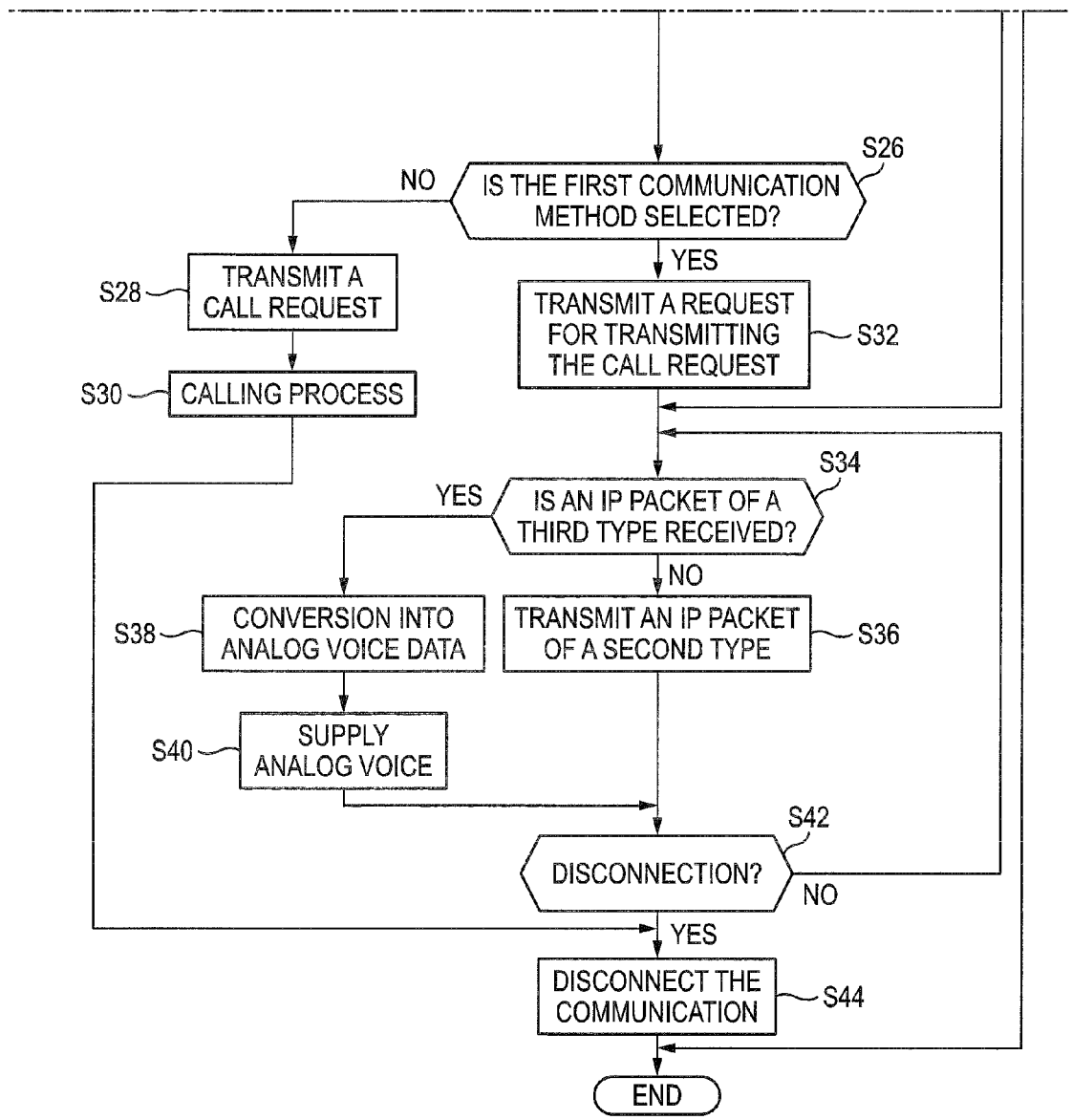

When the user performs a predetermined operation for starting up an application of the program 16 with the operation unit 18 (refer to FIG. 1), the control unit 12 of the first portable telephone apparatus 10 (refer to FIG. 1) starts up the application to start a process of FIG. 4. The control unit 12 displays a message urging the user to input a phone number on the display unit 20. The user operates the operation unit 18 to input a phone number of a telephone apparatus that the user will make a call (for example, second portable telephone apparatus 120, public line telephone apparatus 140) and performs an operation for completing the input. The control unit 12 monitors whether the input operation of the phone number by the user is completed (S12). When the input operation of the phone number is completed (YES in S14), the control unit 12 determines whether the inputted phone number is a phone number of a portable telephone terminal apparatus that can be connected to the mobile communication network 110 (S14). When a result of the determination in S14 is YES, the control unit proceeds to S24. On the other hand, when a result of the determination in S14 is NO, i.e., when the inputted phone number is a phone number of a public line telephone apparatus connected to the public line, the control unit 12 transmits a request for connection, which includes the identification information and authentication information of the first portable telephone apparatus 10, to the multi-functional apparatus 30 (S16). Then, the control unit 12 receives an authentication result from the multi-functional apparatus 30. The control unit 12 uses the result of authentication to determine whether the first portable telephone apparatus is correctly authenticated in the multi-functional apparatus 30 (S18). When a result of the determination in S18 is NO, the control unit displays a screen, which indicates that the first portable telephone apparatus cannot be authenticated, on the display unit 20 and thus ends the process.

On the other hand, when a result of the determination in S18 is YES, the control unit 12 generates an IP packet of a first type including information indicating the phone number inputted in S14. The control unit 12 transmits the generated IP packet of the first type to the multi-functional apparatus (S20). Then, the control unit 12 monitors whether an IP packet of a fourth type is received from the multi-functional apparatus 30 to which the IP packet of the first type is transmitted (S22). When a result of the monitoring is YES, the control unit proceeds to S24. On the other hand, when a result of the monitoring is NO, the control unit proceeds to S34. In S24, the control unit 12 displays communication method information, which is included in the IP packet of the fourth type received in S22, on the display unit 20. In addition, in S24 for a case where a result of the determination in S14 is YES, the control unit 12 displays communication method information, which indicates that a communication should be performed with a second communication method, on the display unit 20. In another exemplary embodiment, the control unit 12 may supply the speaker unit 28 with analog voice data corresponding to the communication method information. In addition, the control unit 12 displays a screen urging the user to designate one of first and second communication methods on the display unit 20. The first communication method is a communication method of performing a voice data communication between the first portable telephone apparatus 10 and a telephone apparatus, to which the first portable telephone apparatus makes a call, through the multi-functional apparatus 30. The second communication method is a communication method of performing a voice data communication between the first portable telephone apparatus 10 and a telephone apparatus, to which the first portable telephone apparatus makes a call, without through the multi-functional apparatus 30. The user can operate the operation unit 18 to designate one of the first and second communication methods.

The control unit 12 monitors the communication method designated by the user in accordance with the display on the display unit 20 (S26).

When the user designates the first communication method, the control unit 2 selects the first communication method (YES in S26). When the second communication method is designated, the control unit selects the second communication method (NO in S26). When a result of the determination in S26 is YES, the control unit proceeds to S32. When a result of the determination in S26 is NO, the control unit proceeds to S28. In S28, the control unit 12 designates the phone number inputted in S14 as a transmit destination and transmits a call request. The control unit 12 transmits the call request via the mobile communication network 110. Then, the control unit 12 carries out a calling process (S30). In the calling process, the control unit 12 receives a response to the call request that is transmitted in S28. When the response is a negative response, the control unit 12 ends the calling process. On the other hand, when the response is a positive response, the control unit 12 executes a following process. The control unit 12 converts digital voice data, which is received via the mobile communication network 110, into analog voice data. Then, the control unit 12 supplies the analog voice data to the speaker unit 28. The speaker unit 28 outputs voice corresponding to the supplied analog voice data. In addition, the control unit 12 converts analog voice data, which is obtained by the microphone unit 28, into digital voice data. Then, the control unit 12 transmits the converted digital voice data to a telephone apparatus of a communication destination (for example, second portable telephone apparatus 120) via the mobile communication network 110. When the user operates the operation unit 18 to disconnect the communication (for example, the user operates the hook key) or the control unit 12 receives a request for disconnection from the telephone apparatus of the communication destination, the calling process is ended. When the calling process is ended, the control unit proceeds to S44.

In S32, the control unit 12 transmits a request for transmitting the call request to the multi-functional apparatus 30 via the IP network 100. When the control unit 12 receives a negative response to the call request from the multi-functional apparatus 30, it ends the process. On the other hand, when the control unit 12 receives a positive response to the call request, it executes a voice data communication process. The voice data communication process includes the processes of S34 to S42. In the voice data communication process, the analog voice data corresponding to the voice, which is inputted through the microphone unit 26 by the user, is always converted into digital voice data.

The control unit 12 determines whether an IP packet of a third type is received via the IP network 100 (S34). When a result of the determination is NO, the control unit proceeds to S36. When a result of the determination is YES, the control unit proceeds to S38. In S38, the control unit converts digital voice data included in the IP packet of the third type into analog voice data. Then, the control unit 12 supplies the converted analog voice data to the speaker unit 28 (S40) and proceeds to S42. When a result of the determination in S34 is NO, i.e., when analog voice data is obtained by the microphone unit 26, the control unit transmits an IP packet of a second type including the digital voice data, which is converted from the analog voice data obtained by the microphone unit 26, to the multi-functional apparatus 30 via the IP network (S36). The IP packet of the second type includes information indicating an IP address of the multi-functional apparatus 30 and a phone number of a telephone apparatus of the communication destination of the digital voice data, in addition to the digital voice data. When the process of S36 ends, the control unit proceeds to S42. In addition, in the voice data communication process, the processes of S38 and S40 and the process of S36 are processes that are substantially carried out in parallel.

In S42, the control unit 12 determines whether or not to disconnect the voice data communication. To be more specific, when the user operates the operation unit 18 to disconnect the communication (for example, the user operates the hook key) or a request for disconnection is received from the multi-functional apparatus 30, the control unit 12 determines "YES" in S42. When a result of the determination is NO, the control unit returns to S34. When a result of the determination is YES, the control unit proceeds to S44. In S44, the control unit 12 disconnects the current communication to end the process.

(Process that Multi-Functional Apparatus 30 Executes)

Figures 5, 5A, 5B:
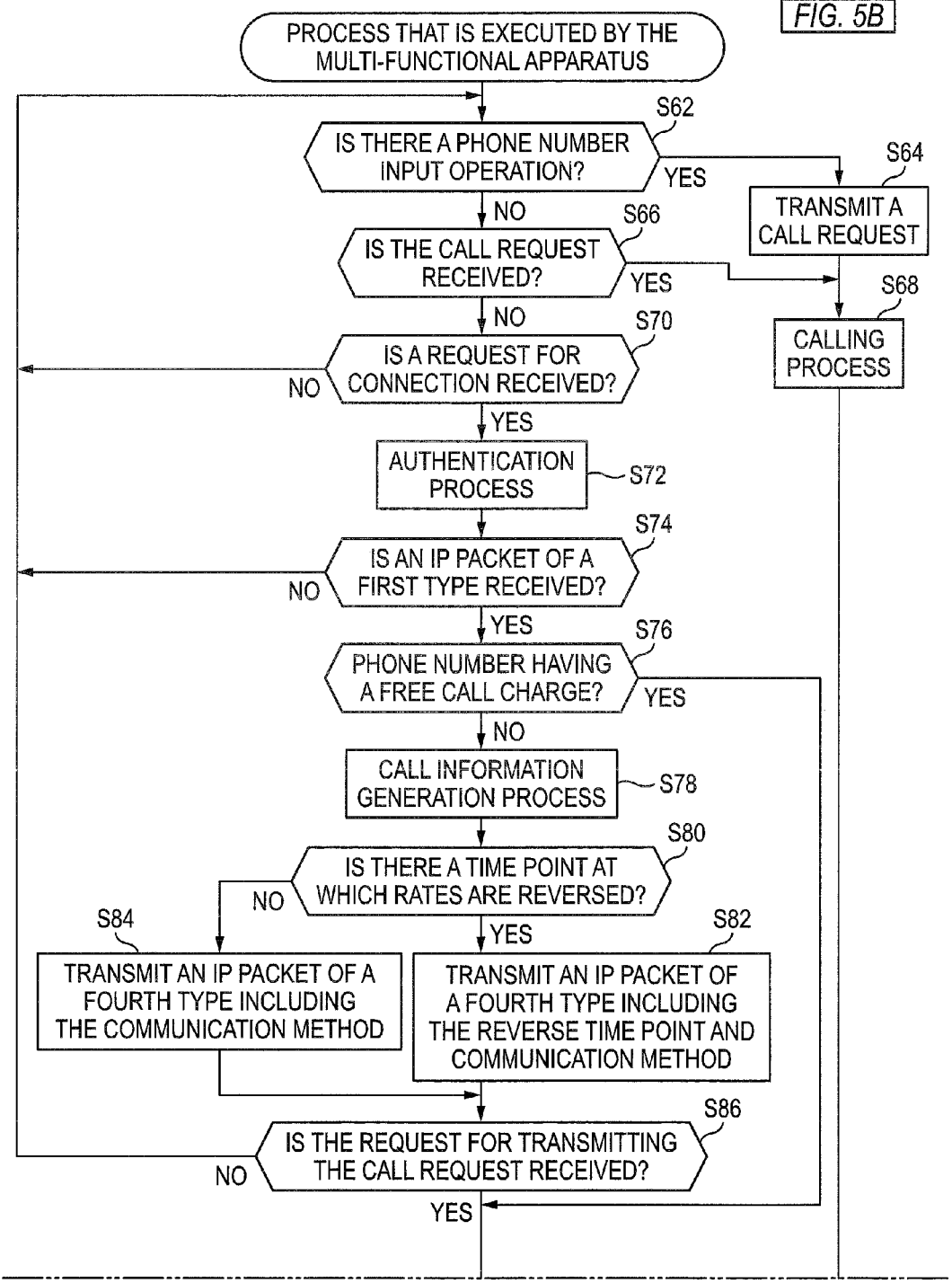
FIG. 5A and FIG. 5B are flow charts of a process that is executed by a multi-functional apparatus of a first exemplary embodiment.
Figure 5B:
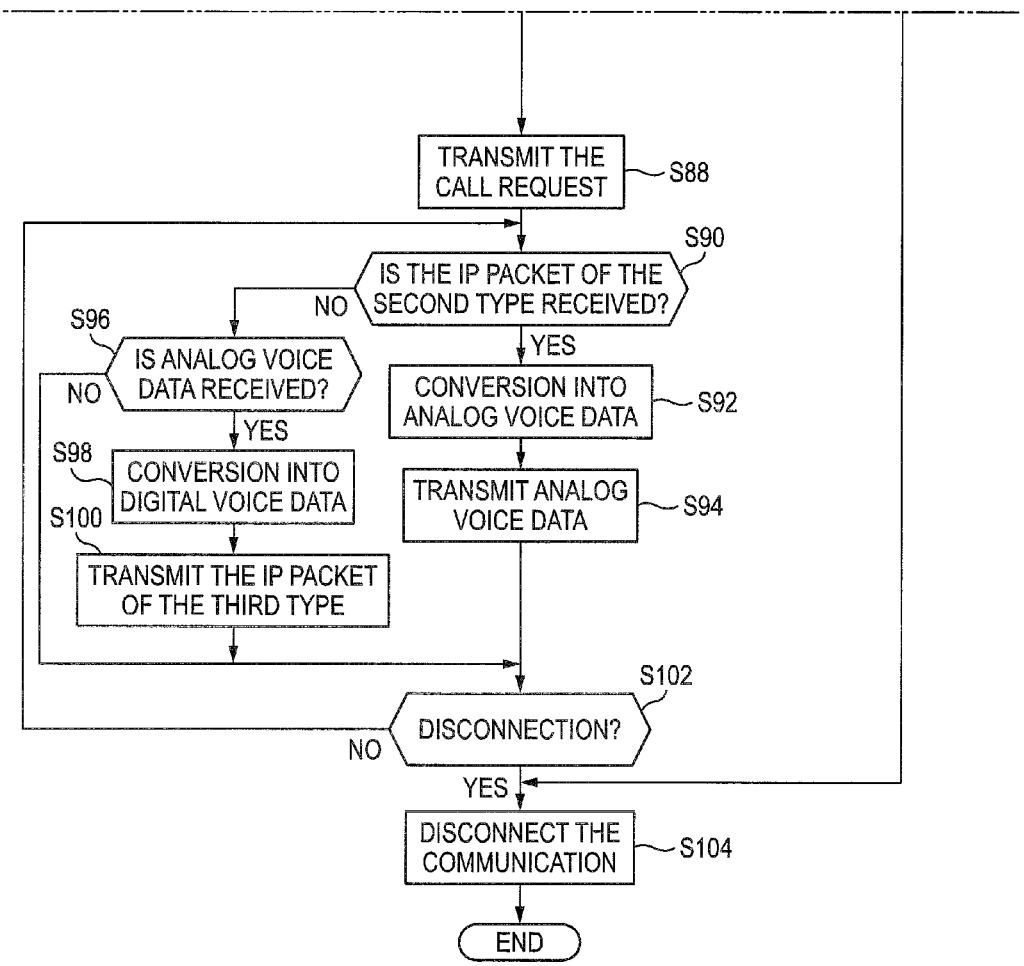

Continuously, a process that the multi-functional apparatus 30 executes will be specifically described in accordance with FIG. 5. The call control unit 44 of the multi-functional apparatus 30 (refer to FIG. 1) monitors whether a phone number input operation is performed in the operation unit 36 (refer to FIG. 1) (S62). When a predetermined operation (for example, an operation of the hook key) is performed in the operation unit 36, the call control unit 44 determines that a phone number input operation has been performed. Here, when a result of the monitoring in S62 is YES, the call control unit 44 designates the phone number, which is inputted by the phone number input operation, as a transmit destination, and transmits a call request via the PSTN 130 (S64). The call request includes information indicating a phone number of the multi-functional apparatus 30. When the call control unit 64 receives a negative response to the call request from a transmit destination of the call request, it returns to S62.

On the other hand, when the call processing unit 46 receives a positive response to the call request, it executes a calling process (S68). In the followings, a calling process will be described when the multi-functional apparatus 30 performs the voice data communication with the public line telephone apparatus 140 (i.e., the phone number of the public line telephone apparatus 140 is inputted in S62). The call processing unit 46 obtains the analog voice data, which is obtained from the microphone unit 32, from the microphone unit 32. The call processing unit 46 transmits the obtained analog voice data to the public line telephone apparatus 140 via the PSTN 130. In addition, the call processing unit 46 receives the analog voice data from the public line telephone apparatus 140 via the PSTN 130. The call processing unit 46 supplies the received analog voice data to the speaker unit 34. The speaker unit 34 outputs voice corresponding to the supplied analog voice data. When the user operates the operation unit 36 to disconnect the communication (for example, the user operates the hook key) or a request for disconnection is received from the public line telephone apparatus 140, the calling process is ended. When the calling process ends, the call control unit proceeds to S104.

In addition, the call control unit 44 monitors whether the call request is received via the PSTN 130 (S66). When a result of the monitoring in S66 is YES, the call control unit 44 executes a predetermined process. For example, the call control unit 44 may supply the speaker unit 34 with predetermined ring tone data or display a predetermined display on the display unit 36. When the user performs a predetermined operation with the operation unit 36, the call processing unit 46 executes the calling process of S68.

When a result of the monitoring in S66 is NO, the step proceeds to the step in S70. In addition, the call control unit 44 monitors whether a request for connection is received via the IP network 100 (S70). When a result of the monitoring is NO, the call control unit 44 returns to S62. In other words, the call control unit 44 repeatedly carries out the processes of S62, S66 and S70 until a result of the monitoring in any one of S62, S66 and S70 becomes YES. When a result of the monitoring in S70 is YES, the call control unit proceeds to S72. In the followings, a case will be described in which the first portable telephone apparatus 10 transmits the request for connection (refer to S16 of FIG. 4). In S72, the call control unit 44 executes an authentication process. In the authentication process, the call control unit 44 determines whether the identification information and authentication information of the telephone apparatus, which are included in the received request for connection, are matched and stored in the memory unit 60. Then, when the identification information is stored in the memory unit 60, the call control unit 44 transmits an authentication result, which indicates that the authentication is correctly made, to the first portable telephone apparatus 10 via the IP network 100. On the other hand, when the identification information is not stored in the memory unit 60, the call control unit 44 transmits an authentication result, which indicates that the authentication is not correctly made, to the first portable telephone apparatus 10 via the IP network 100.

Then, the call control unit 44 determines whether the IP packet of the first type is received from the first portable telephone apparatus 10 via the IP network 100 (S74). When a result of the determination is YES, the call control unit proceeds to S76. When a result of the determination is NO, the call control unit returns to S62. In S76, the determination section 56 (refer to FIG. 1) determines whether the phone number information included in the IP packet of the first type (the phone number information corresponding to the phone number of the public line telephone apparatus 140) corresponds to a phone number having a free call charge (S78). The "free call charge" means that a call charge that a user of a telephone apparatus of a transmit source should pay a carrier is free and includes a case where a user of a telephone apparatus of a transmit destination pays a call charge to a carrier. When a result of the determination is YES, the call control unit proceeds to S88. When a result of the determination is NO, the call control unit proceeds to S78. In S78, the specific processing section 58 executes a rate information generation process.

The rate information generation process that is executed by the specific processing section 58 will be described. The specific processing section 58 obtains the rate plan 71 that is stored in the memory unit 60 correspondingly to the identification information obtained in S70. In the followings, a case will be described in which the specific processing section 58 obtains the fourth plan 79 (refer to FIG. 2). The specific processing section 58 obtains the fixed upper limit amount 72 (i.e., "No"), the packet rate 73 (i.e., "7"), the calling rate 74 (i.e., "30") and the amount of free telephone call 75 (i.e., "2000"), which are registered in the portable rate table 70 correspondingly to the fourth plan 79. Then, the specific processing section 58 obtains the calling rate 82 (here, "10"), which is registered in the PSTN rate table 30 correspondingly to the area code of the phone number information received in S74. Then, the specific processing section 58 calculates first rate information and second rate information using the respective rates 72 to 75, 82 obtained. The first rate information is information indicating a temporal change in a first rate that is necessary when a voice data communication is performed through the multi-functional apparatus 30 (hereinafter, referred to as "first communication method"). The second rate information is information indicating a temporal change in a second rate that is necessary when a voice data communication is performed without through the multi-functional apparatus 30 (hereinafter, referred to as "second communication method"). In addition, the second communication method (the method of performing the voice data communication without through the multi-functional apparatus 30) may be also referred to as a communication method in which the first portable telephone apparatus 10 and another telephone apparatus directly perform the voice data communication (through the mobile communication network 110 and the like).

The specific processing section 58 uses the fixed upper limit amount 72, the packet rate 73 and the calling rate 82 to calculate the first rate information. A line 152 shown in FIG. 6 indicates rate information that is obtained using the fixed upper limit amount 72 "No" and the packet rate 73 "7." In other words, the line 152 indicates a temporal change in the rate that is necessary to perform an IP packet communication between the first portable telephone apparatus 10 and the multi-functional apparatus 30 via the IP network 100. In addition, a horizontal axis of FIG. 6 indicates communication time and a vertical axis indicates a rate. A line 154 indicates rate information that is obtained using the calling rate 82 "10." In other words, the line 154 indicates a temporal change in the rate that is necessary to perform a voice data communication between the multi-functional apparatus 30 and the public line telephone apparatus 140 via the PSTN 130. The specific processing section 58 calculates the first rate information by adding the rates of the rate information indicated by the line 152 and the rate information indicated by the line 154. A line 150 indicates the first rate information. The specific processing section 58 uses the calling rate 74 "30" and the amount of free telephone call 75 "2000" to calculate the second rate information. A line 160 indicates the second rate information.

Figure 6:
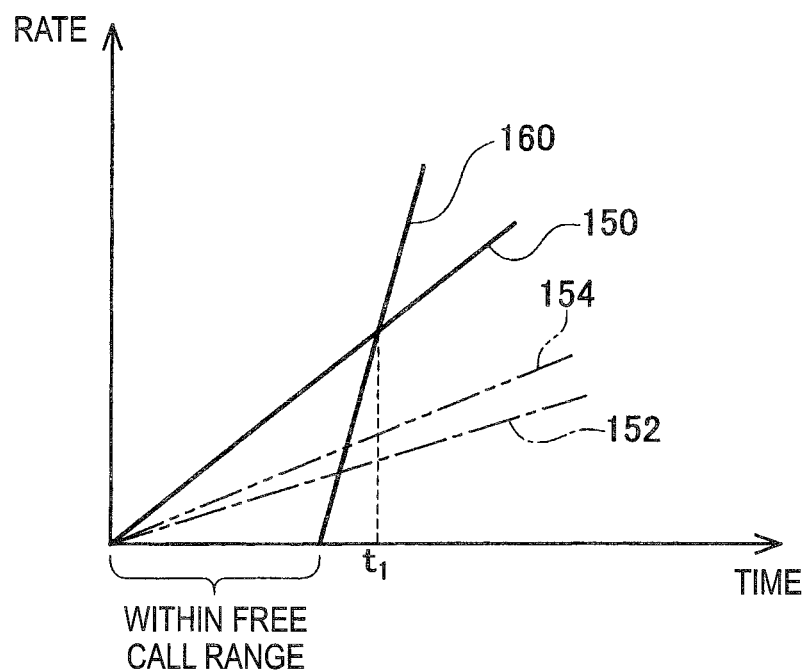
FIG. 6 is a graph for illustrating a rate information generation process.

When the rate information generation process by the specific processing section 58 is ended, the specific processing section 58 uses the first and second rate information to determine whether there is a time point at which the necessary rates are reversed (S80). In FIG. 6, the necessary rates are reversed at a time point of call duration t1. When the call duration is shorter than t1, the second rate is cheaper. When the call duration is longer than t1, the first rate is cheaper. In other words, when the call duration is shorter than t1, it is cheaper to perform the voice data communication with the second communication method. When the call duration is longer than t1, it is cheaper to perform the voice data communication with the first communication method.

When a result of the determination in S80 is YES, the specific processing section 58 transmits an IP packet of a fourth type including the communication method information, which indicates that when the call duration is shorter than t1, the second communication method is cheaper and when the call duration is longer than t1, the first communication method is cheaper, to the first portable telephone apparatus 10 via the IP network 100 (S82). On the other hand, when a result of the determination in S80 is NO, the specific processing section 58 transmits an IP packet of a fourth type including the communication method information, which indicates a communication method corresponding to the cheaper rate information of the first and second rate information generated in S78, to the first portable telephone apparatus 10 via the IP network 100 (S84). When the process of S82 or S84 ends, the call control unit proceeds to S86.

In S86, the call control unit 44 determines whether the request for transmitting the call request is received from the first portable telephone apparatus 10 via the IP network 100. When the request for transmitting the call request is received in a preset time period, the call control unit 44 determines YES in S86. On the other hand, when the request for transmitting the call request is not received in the preset time period, the call control unit 44 determines NO in S86. When a result of the determination in S86 is NO, the call control unit returns to S62. On the other hand, when a result of the determination in S86 is YES (i.e., the request for transmitting the call request is received in the preset time period), the call request transmission section 50 (refer to FIG. 1) transmits the call request to the public line telephone apparatus 140 via the PSTN 130 (S88). The call request transmitted in S88 is identical to the call request transmitted in S64. In other words, the call request includes the phone number information corresponding to the phone number of the multi-functional apparatus 30.

Continuously, the relay unit 48 (refer to FIG. 1) executes a voice data relay process. The voice data relay process includes processes of S90 to S102. In the voice data relay process, the relay unit 48 monitors whether the IP packet of the second type is received from the first portable telephone apparatus 10 via the IP network 100 (S90). When a result of the monitoring in S90 is YES, the conversion section 51 (refer to FIG. 1) converts the digital voice data, which is included in the received IP packet of the second type, into analog voice data (S92). Then, the analog voice data transmission section 52 (refer to FIG. 1) transmits the converted analog voice data to the public line telephone apparatus 140 via the PSTN 130 (S94) and the relay unit proceeds to S102.

The relay unit 48 monitors whether the analog voice data is received from the public line telephone apparatus 140 via the PSTN 130 (S96). When a result of the monitoring is NO, the relay unit proceeds to S102. When a result of the monitoring is YES, the relay unit proceeds to S98. In S98, the conversion section 51 converts the received analog voice data into digital voice data. Then, the digital voice data transmission section 54 (refer to FIG. 1) transmits the IP packet of the third type including the converted digital voice data to the first portable telephone apparatus 10 via the IP network 100 (S100) and the relay unit proceeds to S102.

In S102, the relay unit 48 determines whether or not to disconnect the voice data communication. To be more specific, when a request for disconnection is received from the first portable telephone apparatus 10 or public line telephone apparatus 140, the relay unit 48 determines YES in S102. When a result of the determination is NO, the relay unit returns to S90. When a result of the determination is YES, the relay unit proceeds to S104. In S104, the relay unit 48 disconnects the current communication and ends the process. When the relay unit 48 is connected to the first portable telephone apparatus 10 via the IP network 100, it transmits the request for disconnection to the first portable telephone apparatus 10 via the IP network 100.

The exemplary embodiment has been specifically described. In this exemplary embodiment, when the multi-functional apparatus 30 receives the request for transmitting the call request from the first portable telephone apparatus 10 (S86 in FIG. 5), it transmits the call request including the phone number information of the multi-functional apparatus 30 to the public line telephone apparatus 140 (S88 in FIG. 5). Thereby, the multi-functional apparatus 30 can perform the analog voice data communication with the public line telephone apparatus 140 via the PSTN 130. In addition, the multi-functional apparatus 30 can perform the digital voice data communication with the first portable telephone apparatus 10 via the IP network 100. Thus, the multi-functional apparatus 30 can perform the voice data relay process to relay the voice data communication (the voice data relay process (S92 to S104 in FIG. 5)) between the first portable telephone apparatus 10 and the public line telephone apparatus 140. As a result, for example, the first portable telephone apparatus 10 can perform a voice data communication with a specific public line telephone apparatus that does not receive the call request from the first portable telephone apparatus 10, through the multi-functional apparatus 30. The multi-functional apparatus 30 is particularly useful when a user goes out with the first portable telephone apparatus 10 and it is necessary to make a call from the first portable telephone apparatus 10 to a public line telephone apparatus that cannot directly perform a voice data communication with the first portable telephone apparatus 10, for example.

In addition, the multi-functional apparatus 30 transmits the IP packet of the fourth type, which includes the cheaper communication method of the first communication method (communication through the multi-functional apparatus 30) and the second communication method (communication without through the multi-functional apparatus 30), to the first portable telephone apparatus 10 (S82, S84 in FIG. 5). Thereby, the user of the first portable telephone apparatus 10 can designate a communication method in which the necessary rate is cheaper.

In addition, the multi-functional apparatus 30 is an example of a "telephone apparatus that can be connected to both an IP network and a public switched telephone network" and the first portable telephone apparatus 10 is an example of a "telephone apparatus that can be connected to an IP network." The communication method information is an example of "specific information" and "predetermined information." The process of S24 in FIG. 4 is an example of the "notification process."

Second Exemplary Embodiment

This exemplary embodiment is different from the first exemplary embodiment, in that the control unit 12 of the first portable telephone apparatus 10 includes the determination section 56 and the specific processing section 58. In addition, this exemplary embodiment is different from the first exemplary embodiment, in that the respective tables 70, 80 are stored in the memory unit 14 of the first portable telephone apparatus 10. Additionally, the multi-functional apparatus 30 does not include the determination section 56 and the specific processing section 58. Further, the respective tables 70, 80 are not stored in the memory unit 60 of the multi-functional apparatus 30.

(Process that First Portable Telephone Apparatus Executes)

Figures 7, 7A, 7B:
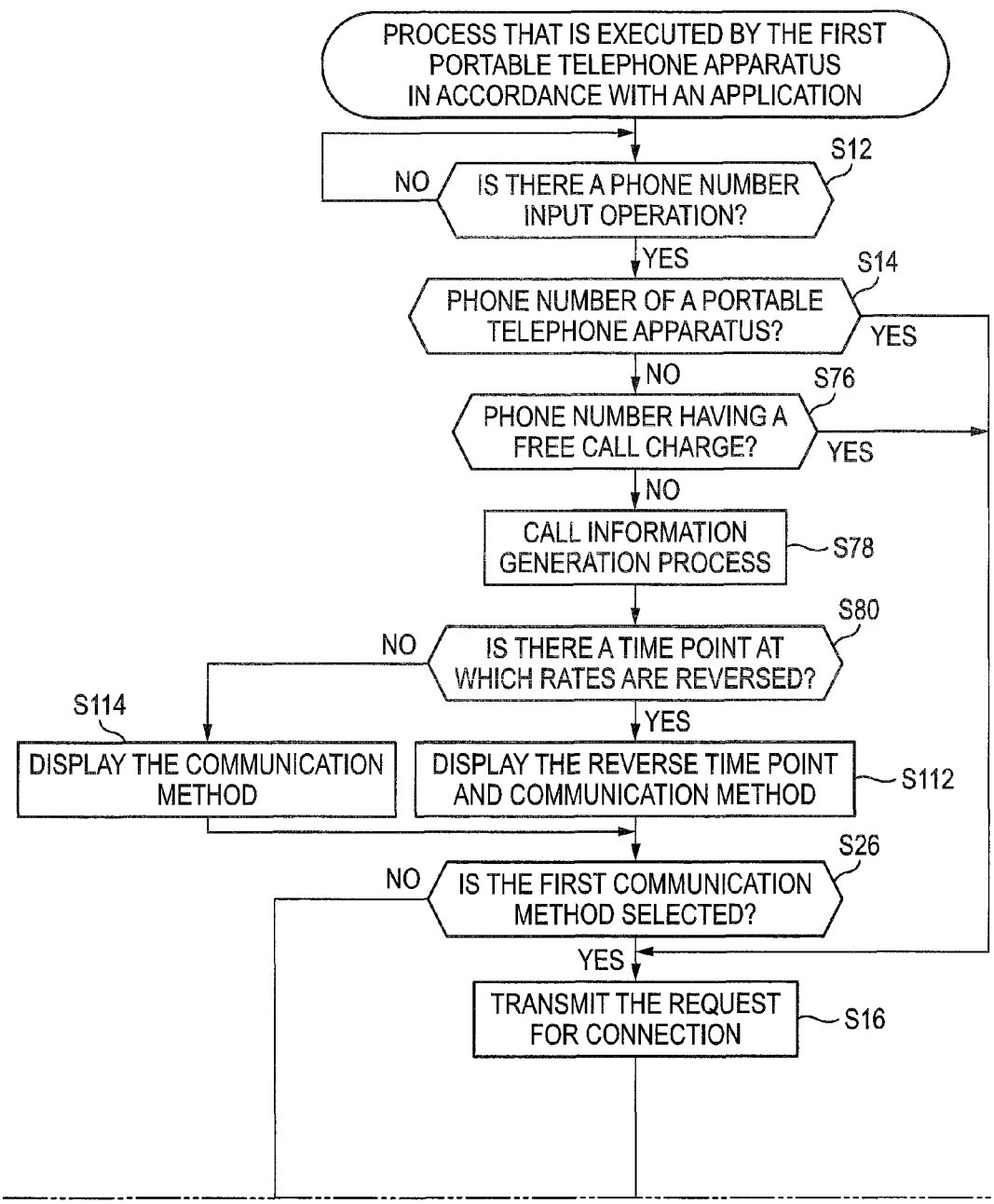
FIG. 7A and FIG. 7B are flowcharts of a process that is executed by a first portable telephone apparatus of a second exemplary embodiment.
Figure 7B:
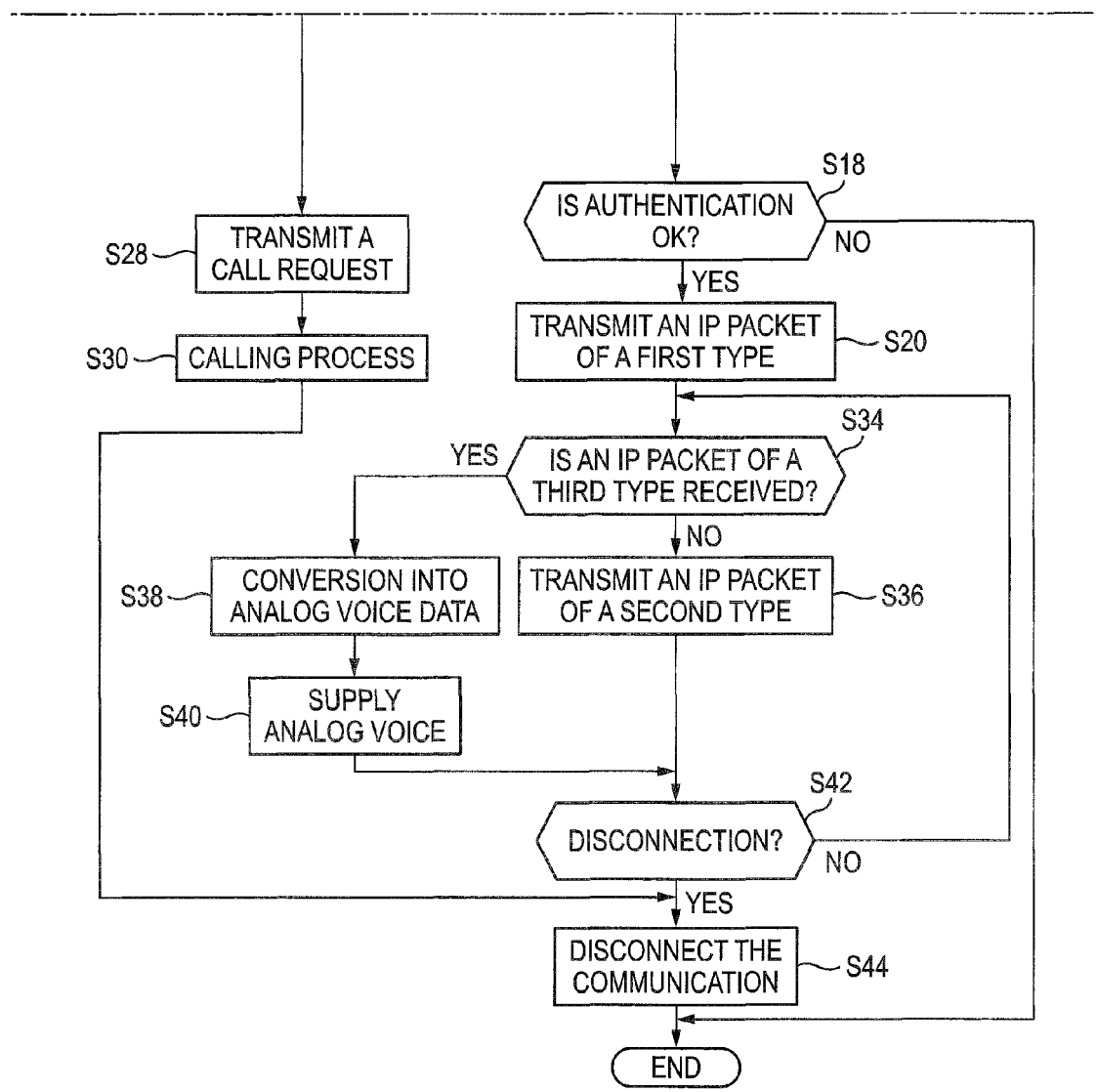

A process that the first portable telephone apparatus 10 executes will be described with reference to FIG. 7 (FIG. 7A and FIG. 7B). S14 and S16 are identical to those of the first exemplary embodiment. In addition, when a result of the determination in S14 is YES, the control unit proceeds to S16. When a result of the determination in S14 is NO, the control unit proceeds to S76. A process of S76 is the same as the process that the determination unit 56 of the multi-functional apparatus 30 executes in the first exemplary embodiment. When a result of the determination in S76 is YES, the control unit proceeds to S16. When a result of the determination in S76 is NO, the control unit proceeds to S78. The processes of S78 and S80 that the specific processing section 58 executes are the same as the processes that the specific processing section 58 of the multi-functional apparatus 30 executes in the first exemplary embodiment. When a result of the determination in S80 is YES, the specific processing section 58 displays a screen, which displays a communication method corresponding to a cheaper rate up to a time point at which the rates are reversed and a communication method corresponding to a cheaper rate after the time point at which the rates are reversed and the time point at which the rates are reversed using the first and second rate information generated in S78 and S80, on the display unit 20 (S112). On the other hand, when a result of the determination in S80 is NO, the specific processing section displays a screen, which indicates a communication method corresponding to the cheaper one of the first and second rate information generated in S78, on the display unit 20 (S114). In S112 and S114, the specific processing section 58 displays also a screen urging a user to designate one of the first and second communication methods on the display unit 20. The control unit 12 monitors the communication method designated by the user in accordance with the display on the display unit 20 in S112 or the display on the display unit in S114.

The control unit 12 executes the processes of S16 to S20 when the process of S26 is ended. In other words, this exemplary embodiment is different from the first exemplary embodiment with respect to the sequence of the processes that the first portable telephone apparatus 10 executes. Additionally, in S20, the control unit 12 transmits the request for transmitting the call request, in addition to the IP packet of the first type. The control unit 12 does not execute the processes of S22, S24 and S32. The subsequent processes are the same as those of the first exemplary embodiment.

In addition, the multi-functional apparatus 30 of this exemplary embodiment does not execute the processes of S76 to S84 in FIG. 5. The other processes are the same as those of the first exemplary embodiment. The second exemplary embodiment has been specifically described. The second exemplary embodiment also can achieve the same effects as those of the first exemplary embodiment.

Modified Exemplary Embodiment (1) In the second exemplary embodiment, the multi-functional apparatus 30 may have the same structure as that of the multi-functional apparatus 30 of the first exemplary embodiment. The multi-functional apparatus 30 may determine whether the request for transmitting the call request is included in the IP packet of the first type received in S75 of FIG. 5, before the process of S76. It may be possible that when a result of the determination is YES, the call control unit proceeds to S88 and when a result thereof is NO, the call control unit proceeds to S76. Additionally, in this case, the first portable telephone apparatus 10 may enable a user to select which of the first portable telephone apparatus 10 and the multi-functional apparatus 30 will execute the rate information generating process. Further, it may be possible that the first portable telephone apparatus 10 determines whether the inputted phone number is a phone number having a free calling rate, and when it is determined that the phone number is a phone number having a free calling rate, the first portable telephone apparatus does not execute the rate information generating process and the multi-functional apparatus 30 executes the voice data communication process and when it is determined that the phone number is not a phone number having a free calling rate, the multi-functional apparatus 30 executes the rate information generating process.

(2) In the first exemplary embodiment, when the first portable telephone apparatus 10 receives the IP packet of the fourth type (S22 in FIG. 4), it displays the communication method information included in the IP packet on the display unit 20. However, the communication method information included in the IP packet of the fourth type and the information displayed on the display unit 20 may be different. For example, the multi-functional apparatus 30 may transmit the first rate information and the second rate information to the first portable telephone apparatus 10, as the communication method information. The first portable telephone apparatus 10 may use the received first and second rate information to specify a cheaper communication method of the first and second communication methods. The first portable telephone apparatus 10 may display information that indicates the specified communication method. In this case, the communication method information is an example of the "specific information" and the information indicating the specified communication method is an example of the "predetermined information."

(3) In addition, for a phone number having a free calling rate, the rate information generating process may be executed. In other words, the process of S76 in FIGS. 5 and 7 may not be executed. In this case, in the rate information generating process, the specific processing section 58 may determine whether the inputted phone number is a phone number having a free calling rate. When it is determined that the inputted phone number is a phone number having a free calling rate, the specific processing section 58 may calculate a rate, which is necessary for the IP packet communication between the multi-functional apparatus 30 and the first portable telephone apparatus 10, as the first rate information.

(4) In the exemplary embodiments, the first portable telephone apparatus 10 may obtain information, which indicates a remaining amount of the amount of free telephone call 75 and an amount of the used IP packet communication, from a carrier of the first portable telephone apparatus 10. In the first exemplary embodiment, the first portable telephone apparatus 10 may transmit the obtained information to the multi-functional apparatus 30. The multi-functional apparatus 30 may use the obtained information to execute the rate information generating process (S78 in FIG. 5). In the second exemplary embodiment, the first portable telephone apparatus 10 may also use the information obtained from the carrier to execute the rate information generating process (S78 in FIG. 7).

(5) The PSTN rate table 80 may have a plurality of tables corresponding to a plurality of carriers. In addition, the portable rate table 70 is the same.

(6) In addition, for example, when the second communication method (i.e., the method of performing a communication without through the multi-functional apparatus 10) is selected (NO in S26 of FIGS. 4 and 7), the first portable telephone apparatus 10 may end an application and execute a typical calling process to make a call.

(7) Additionally, in the first exemplary embodiment, the determination of whether the inputted phone number is a phone number of a portable telephone apparatus (S14 in FIG. 4) may be performed by the multi-functional apparatus 30. The multi-functional apparatus 30 may determine whether the phone number included in the IP packet of the first type received in S74 is a phone number of a portable telephone apparatus. It may be possible that when it is determined that the phone number is not a phone number of a portable telephone apparatus, the multi-functional apparatus 30 executes the processes after S78 and when it is determined that the phone number is a phone number of a portable telephone apparatus, the multi-functional apparatus 30 transmits the IP packet of the fourth type including information indicating that a communication should be performed by the second communication method.

(8) Additionally, the multi-functional apparatus 30 can be configured to determine whether or not the input telephone number is a telephone number by which the first portable telephone apparatus 10 can directly execute a voice data communication. When the multi-functional apparatus 30 determined that the input telephone number is the telephone number by which the first portable telephone apparatus 10 cannot directly execute a voice data communication, the multi-functional apparatus 30 can relay the voice data communication without executing the rate information generating process. And, the first portable telephone apparatus 10 can be configured to determine whether or not the input telephone number is a telephone number by which the first portable telephone apparatus 10 can directly execute a voice data communication.

In addition, the technical elements described or shown in the specification or drawings exhibit the technical usefulness individually or in various combinations thereof and are not limited to the combinations defined in the claims at the time of filing the application. Further, the technology illustrated in the specification or drawings realizes a plurality of purposes at the same time and has a technical usefulness when one of the purposes is realized.

What is claimed is:

1. A telephone apparatus that can be connected to both an IP network and a public switched telephone network, the telephone apparatus comprising:
a microphone unit, a speaker unit, an operation unit that is operated by a user and a call control unit,
wherein
the call control unit comprises:
a call processing unit that, for at least one of a first case where an operation of transmitting a first call request to a first public line telephone apparatus via the public switched telephone network is performed with the operation unit, the first public line telephone apparatus being connected to the public switched telephone network, and a second case where a second call request is received from the first public line telephone apparatus via the public switched telephone network, transmits first analog voice data obtained by the microphone unit to the first public line telephone apparatus via the public switched telephone network and supplies the speaker unit with second analog voice data received from the first public line telephone apparatus via the public switched telephone network; and
a relay unit that, for a third case where an IP packet of a first type including specific identification information corresponding to a second public line telephone apparatus connected to the public switched telephone network is received from another telephone apparatus via the IP network, the another telephone apparatus capable of being connected to the IP network, relays voice data communication between the another telephone apparatus and the second public line telephone apparatus,
wherein
the relay unit comprises:
a call request transmission section that, for the third case, transmits a third call request to the second public line telephone apparatus via the public switched telephone network;
a conversion section that D/A converts first digital voice data, which is included in an IP packet of a second type received from the another telephone apparatus via the IP network, into third analog voice data and A/D converts fourth analog voice data received from the second public line telephone apparatus via the public switched telephone network into second digital voice data;
an analog voice data transmission section that transmits the third analog voice data to the second public line telephone apparatus via the public switched telephone network;
a digital voice data transmission section that transmits an IP packet of a third type including the second digital voice data to the another telephone apparatus via the IP network; and
a determination section that, for the third case, determines whether a calling rate between the telephone apparatus and the second public line telephone apparatus is free based on the specific identification information,
wherein
the call request transmission section transmits the third call request, for the third case and when it is determined that a calling rate between the telephone apparatus and the second public line telephone apparatus is free, and
wherein
the relay unit further comprises a specific processing section that executes a specific process, for the third case and when it is determined that a calling rate between the telephone apparatus and the second public line telephone apparatus is not free.

2. The telephone apparatus according to claim 1,
wherein
the specific process includes:
a generation process of generating first rate information about a first rate, the first rate being necessary to perform a voice data communication between the another telephone apparatus and the second public line telephone apparatus through the telephone apparatus and second rate information about a second rate, the second rate being necessary to perform a voice data communication between the another telephone apparatus and the second public line telephone apparatus without through the telephone apparatus; and
a transmission process of transmitting an IP packet of a fourth type, which includes specific information obtained according to the first rate information and the second rate information, to the another telephone apparatus via the IP network.

3. The telephone apparatus according to claim 2,
wherein
the first rate information comprises first information about communication rates of the IP packets of the second and third types, which are communicated between the another telephone apparatus and the telephone apparatus, and second information about communication rates of the third and fourth analog voice data, which are communicated between the telephone apparatus and the second public line telephone apparatus.

4. The telephone apparatus according to claim 2,
wherein
the first rate information comprises information about a temporal change in the first rate,
wherein
the second rate information comprises information about a temporal change in the second rate, and
wherein
the specific processing section uses the first rate information and the second rate information to specify a specific time point at which the necessary rates are reversed and generates the specific information including information about the specific time point.

5. The telephone apparatus according to claim 4,
wherein
the specific processing section generates the specific information indicating a cheaper voice data communication of the voice data communication through the telephone apparatus and the voice data communication without through the telephone apparatus, when the specific time point does not exist.

6. A non-transitory computer readable medium storing a program for a telephone apparatus that can be connected to an IP network, the program enabling a computer mounted to the telephone apparatus to execute:
a selection process of selecting whether to perform a voice data communication with a public line telephone apparatus connected to a public switched telephone network through another telephone apparatus that can be connected to both the IP network and the public switched telephone network or to perform a voice data communication with the public line telephone apparatus without through another telephone apparatus;
a first transmission process of transmitting an IP packet of a first type including specific identification information corresponding to the public line telephone apparatus to the another telephone apparatus via the IP network;
a second transmission process of transmitting an IP packet of a second type including first digital voice data corresponding to analog voice data obtained by a microphone unit of the telephone apparatus to the another telephone apparatus via the IP network when it is selected to perform the voice data communication through the another telephone apparatus;
a supply process of supplying a speaker unit of the telephone apparatus with analog voice data corresponding to second digital voice data included in an IP packet of a third type received from the another telephone apparatus via the IP network;
a reception process of receiving an IP packet of a fourth type including specific information from another apparatus via the IP network, the specific information being obtained according to first rate information about a first rate necessary to perform a voice data communication between the telephone apparatus and the public line telephone apparatus through the another telephone apparatus and second rate information about a second rate necessary to perform a voice data communication between the telephone apparatus and the public line telephone apparatus without through the another telephone apparatus; and
a notification process of notifying a user with predetermined information obtained according to the specific information,
wherein
when a specific operation is executed by a user according to notified prescribed information it is selected to perform the voice data communication through the another telephone apparatus in the selection process.

7. The computer readable medium according to claim 6,
wherein
the predetermined information includes: a first table that indicates a first relationship between a call time and a calling rate based on the first rate information; and a second table that indicates a second relationship between a call time and a calling rate based on the second rate information;
the predetermined information is information for the user to determine whether the voice data communication is performed through the another telephone apparatus or the voice data communication is performed without through the another telephone apparatus;
and wherein
the specific operation is an operation for the user to select a communication method by which the voice data communication is performed through the another telephone apparatus.

8. A non-transitory computer readable medium storing a program for a telephone apparatus that can be connected to an IP network, the program enabling a computer mounted to the telephone apparatus to execute:
a selection process of selecting whether to perform a voice data communication with a public line telephone apparatus connected to a public switched telephone network through another telephone apparatus that can be connected to both the IP network and the public switched telephone network or to perform a voice data communication with the public line telephone apparatus without through another telephone apparatus;
a first transmission process of transmitting an IP packet of a first type including specific identification information corresponding to the public line telephone apparatus to the another telephone apparatus via the IP network;
a second transmission process of transmitting an IP packet of a second type including first digital voice data corresponding to analog voice data obtained by a microphone unit of the telephone apparatus to the another telephone apparatus via the IP network when it is selected to perform the voice data communication through the another telephone apparatus;
a supply process of supplying a speaker unit of the telephone apparatus with analog voice data corresponding to second digital voice data included in an IP packet of a third type received from the another telephone apparatus via the IP network;
a generation process of generating predetermined information obtained according to first rate information about a first rate necessary to perform a voice data communication between the telephone apparatus and the public line telephone apparatus through the another telephone apparatus and second rate information about a second rate necessary to perform a voice data communication between the telephone apparatus and the public line telephone apparatus without through the another telephone apparatus; and a notification process of notifying a user with the predetermined information, and wherein when a specific operation is executed by a user according to notified prescribed information, it is selected to perform the voice data communication through the another telephone apparatus in the selection process.

9. The computer readable medium according to claim 8, wherein the predetermined information includes: a first table that indicates a first relationship between a call time and a calling rate based on the first rate information; and a second table that indicates a second relationship between a call time and a calling rate based on the second rate information;

the predetermined information is information for the user to determine whether the voice data communication is performed through the another telephone apparatus or the voice data communication is performed without through the another telephone apparatus;

and wherein the specific operation is an operation for the user to select a communication method by which the voice data communication is performed through the another telephone apparatus.

* * * * *